Feb. 22, 1966 J. A. MAS 3,237,079
COMPACT TRANSFORMER AND RECTIFIER
Filed May 5, 1961 4 Sheets-Sheet 1
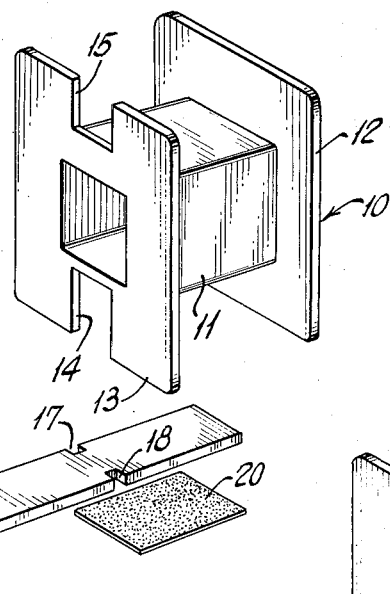
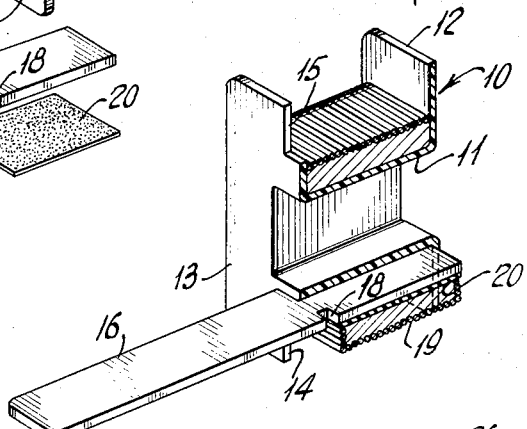
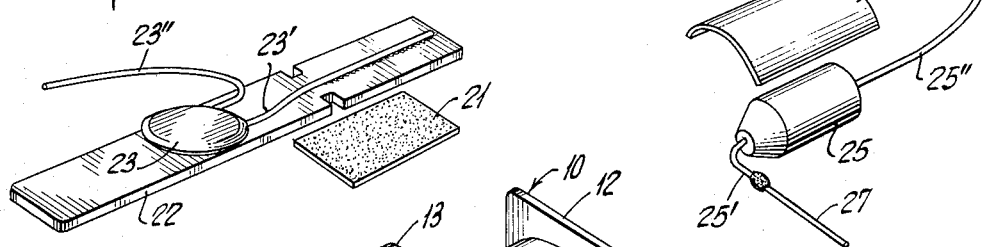
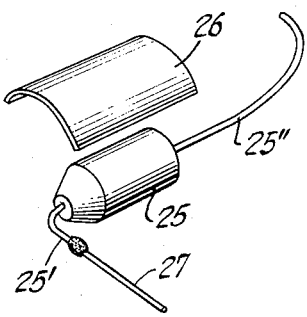
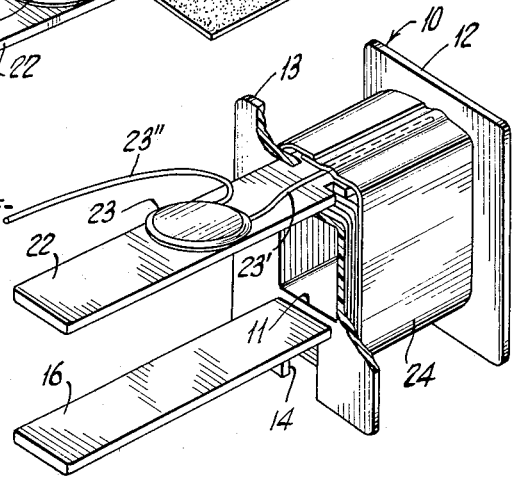
INVENTOR
JOSEPH A. MAS
BY
ATTORNEY

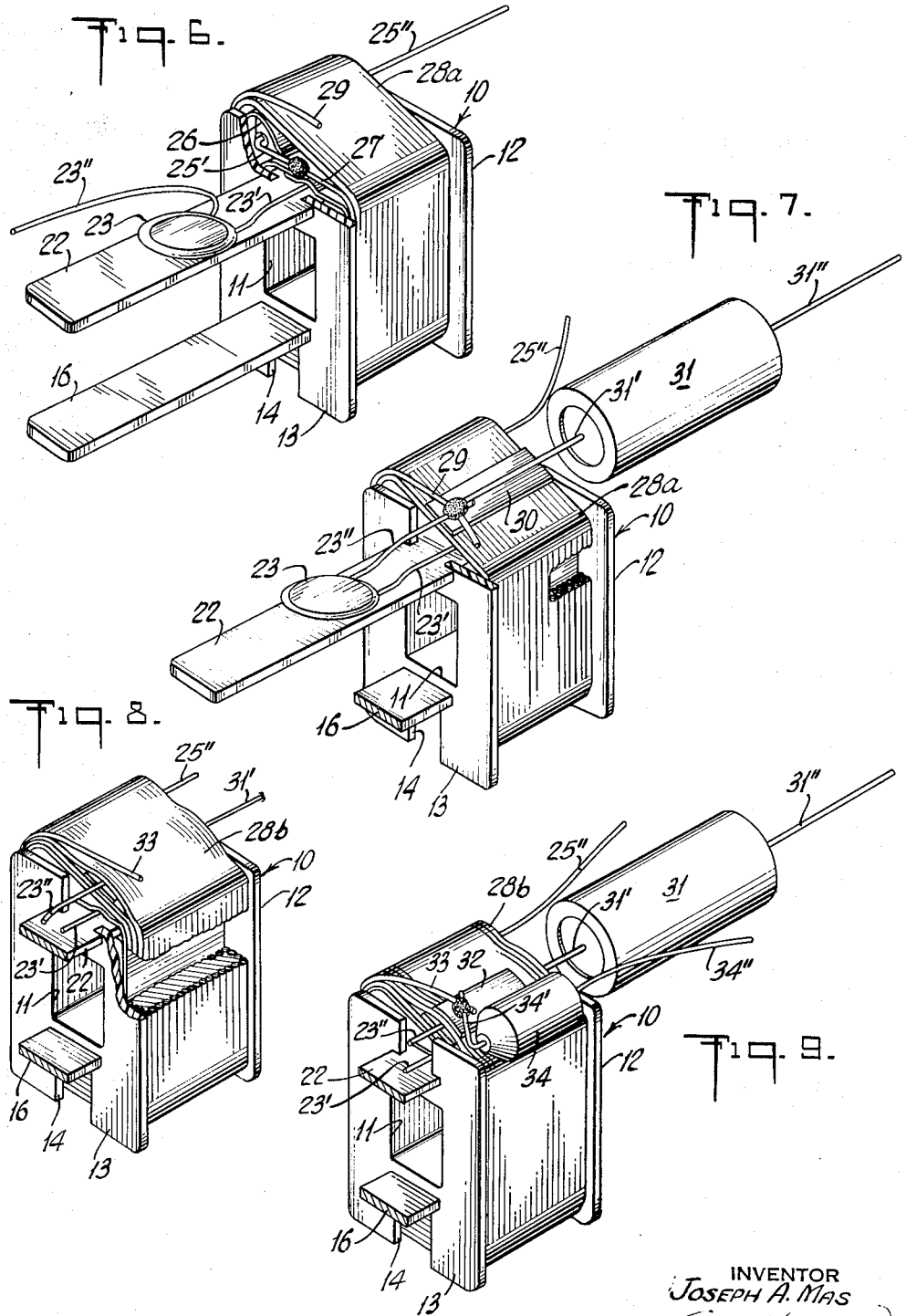

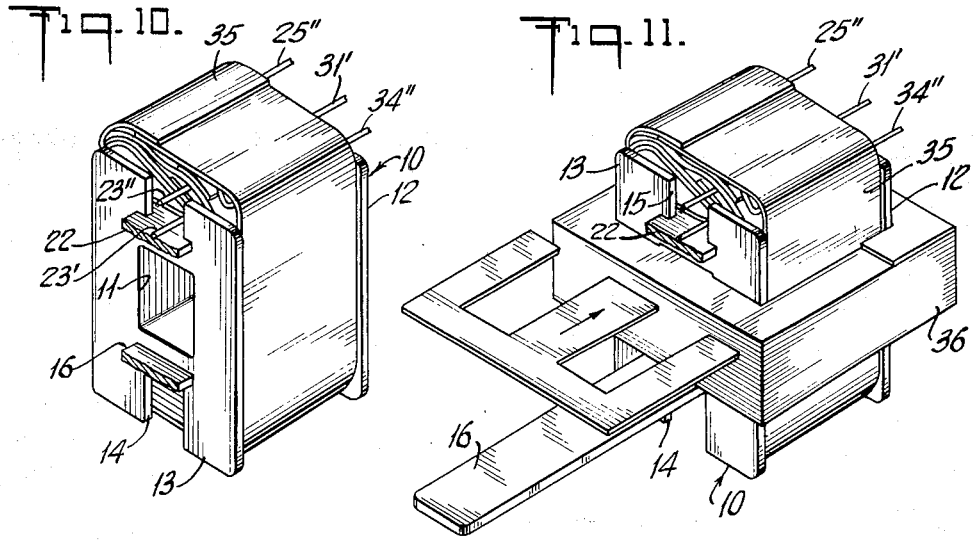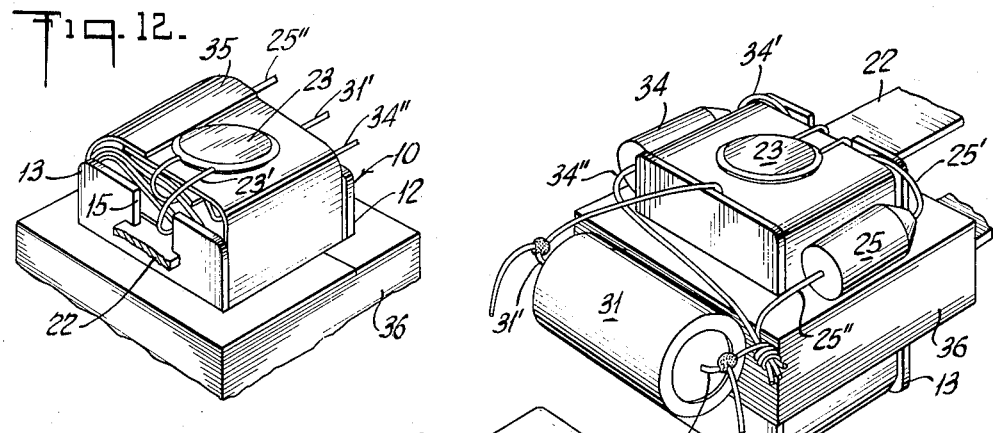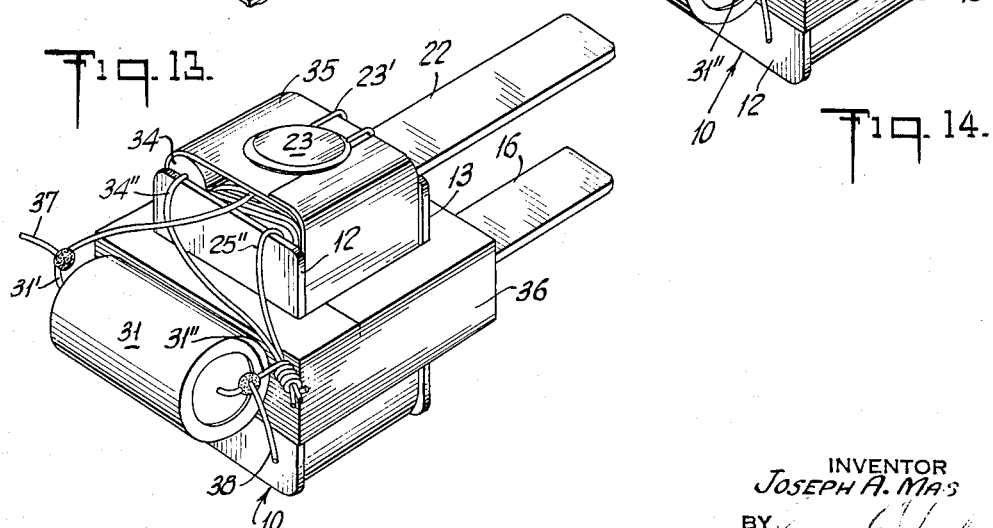

Feb. 22, 1966  J. A. MAS  3,237,079
COMPACT TRANSFORMER AND RECTIFIER
Filed May 5, 1961  4 Sheets-Sheet 4

INVENTOR
JOSEPH A. MAS
BY
ATTORNEY

United States Patent Office 3,237,079
Patented Feb. 22, 1966

3,237,079
COMPACT TRANSFORMER AND RECTIFIER
Joseph A. Mas, 3 Maple Way Drive, Woodbury,
Long Island, N.Y.
Filed May 5, 1961, Ser. No. 108,103
9 Claims. (Cl. 321—8)

This invention relates to electrical apparatus and more specifically to a novel and improved device for transforming electrical energy which is useful, among other things, for powering electrical equipment, charging batteries and the like.

While the instant invention is generally useful for a variety of applications, it is particularly useful as a power supplying device and battery charger for miniaturized electronic equipment. Through a novel and improved arrangement and organization of elements, an exceedingly compact, rugged and dependable structure is provided which can be fabricated at relatively low cost. These ends are attained by the incorporation of the circuit elements into a substantially single composite unit with the elements constituting essentially integral parts of the completed structure.

The advantages of this invention are particularly useful in the fabrication of highly compact, miniaturized power supplies for rectifying alternating current to charge miniature batteries or supply energy for the operation of small electronic equipment.

In the case of a device in accordance with the invention which is intended to be connected to a conventional A.C. current outlet, the prongs which are utilized for insertion in the outlet are formed integrally with transforming means to modify the A.C. current voltage and said transforming means is arranged with the necessary associated elements formed integrally therewith in order to produce the desired output voltage. The resultant structure is therefore supported entirely by the prongs which connect the rectifier to the outlet and the integration of the transformer and associated circuit elements enables the attainment of an exceedingly small, rugged and dependable unit at low cost.

The invention further contemplates the provision of a novel and improved miniaturized power supply and battery charger wherein the voltage transforming and rectifying apparatus may be physically supported by the terminals supplying A.C. current energy to the apparatus.

The above and other objects and advantages of this invention will become more apparent from the following description and accompanying drawings forming part of this application.

In the drawings:

FIG. 1 is a perspective view of a spool for holding a transformer winding and a terminal for engagement with the spool prior to the winding of the transformer;

FIG. 2 is a cross sectional view of the spool of FIG. 1 with a primary winding thereon;

FIG. 3 is a perspective view of a second terminal prong for installation on the spool shown in FIGS. 1 and 2;

FIG. 4 is a perspective view of the spool of FIGS. 1 and 2 with the terminal prongs installed on the spool;

FIG. 5 is a perspective view of a rectifier for installation on the structure shown in FIG. 4;

FIG. 6 is a perspective view of the structure shown in FIG. 4 with the rectifier of FIG. 5 and the first section of a secondary winding applied to the spool;

FIG. 7 is a perspective view similar to FIG. 6 and showing the installation of additional elements;

FIG. 8 is a perspective view similar to FIG. 7 illustrating the installation of the second portion of the secondary winding;

FIG. 9 is a perspective view similar to FIG. 8 illustrating the mounting of a second rectifier element;

FIG. 10 is a view similar to FIG. 9 showing the completion of the transformer structure;

FIG. 11 shows the installation of the core material in the structure of FIG. 10;

FIG. 12 is a fragmentary view of FIG. 11 showing the positioning of certain circuit elements on the transformer;

FIG. 13 shows the completed rectifying structure;

FIG. 14 shows a modified embodiment of the invention shown in FIG. 13;

Figure 15:
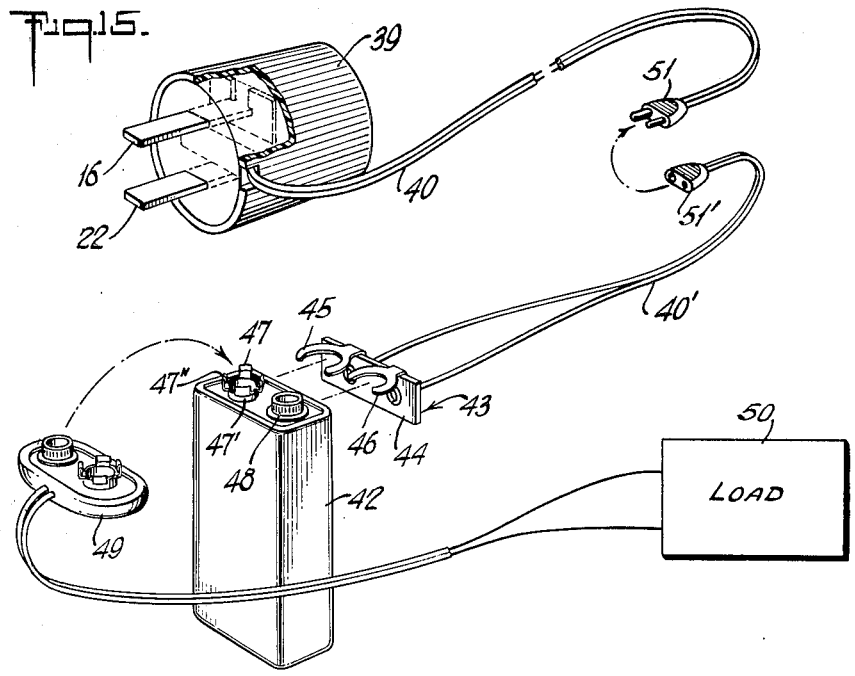
FIG. 15 is a full sized perspective view of the structure shown in FIG. 13 enclosed within a housing and showing improved connecting means for attachment of the rectifier to a battery.

As pointed out above, while this invention is useful for a variety of applications, the improved method in accordance with the invention is particularly useful in fabricating a new and improved and highly compact battery charger and D.C. current supply for small electronic apparatus.

Referring now to the drawings, FIGS. 1 through 13 illustrate successive steps in the fabrication of a power supply in accordance with the invention. For illustrative purposes the structures in these figures have been enlarged approximately two and a half times normal size.

In the fabrication of the apparatus in accordance with the invention, a spool 10 is provided having a rectangular tubular portion 11 and end plates 12 and 13. The spool 10 is preferably formed as an integral unit of suitable insulating material. In the instant embodiment of the invention, the end plate 13 of the core is provided with a pair of slots 14 and 15, the slot 14 being cut to the full depth of the winding space while the slot 15 is cut to a depth that will be approximately aligned with the outer surfaces of the primary winding when applied to the spool.

Figure 17:
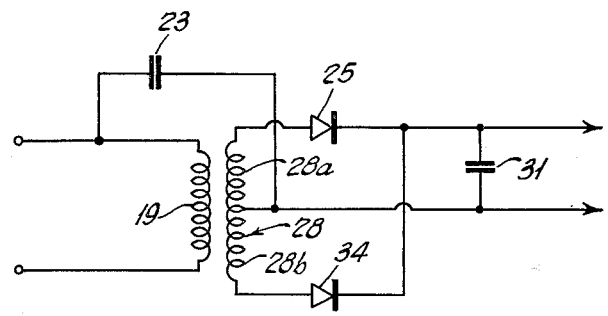
FIG. 17 is a circuit diagram of rectifiers illustrated in FIGS. 13 and 14.

In the first step in the assembly of the elements of this invention an elongated terminal member or prong 16 is provided with a pair of opposing slots 17 and 18 which are spaced from one end of the prong a distance substantially equal to the distance between the inner surfaces of the end members or plates 12 and 13 of the spool 10. The prong 16 is placed in the slot 14 of the spool 10 and the starting end of the primary winding 19 is soldered or otherwise secured to that portion of the member 16 lying within the spool 10. When the connection is made a thin piece of insulating material 20 is placed over the portion of the member 16 lying within the spool 10 and the spool is then wound with the primary winding as shown in FIG. 2. Upon completion of the primary winding 19 a small piece of insulating material 21 is placed over the primary winding and in line with the slot 15, previously described. A second terminal 22, identical to the first terminal 16 is then placed in engagement with the slot 15. In the instant embodiment of the invention a small capacitor 23 which is connected between one leg of the primary winding 19 is shown in FIG. 17 and one leg of the secondary winding to be described is utilized to bypass RF energy. In this embodiment of the invention one leg 23' of the condenser 23 is preferably soldered to the terminal 22 as illustrated in FIG. 3 prior to installation of the terminal on the spool 10. When the terminal 22 is in place on the spool 10 as shown in FIG. 4, the terminal end of the primary winding 19 is soldered to the terminal 22 and then the winding is wrapped with a thin layer of insulating material 24.

Inasmuch as the apparatus now being described is intended to be connected to a conventional alternating current outlet, the spool 10 and winding 19 are designed to effect the desired spacing between the prongs 16 and 22 so that the latter will automatically align with the openings in such a conventional outlet. The prongs 16 and 22 are also made of a relatively heavy gauge material such as brass, copper or the like in order to provide the desired support for the completed unit.

Figure 16:
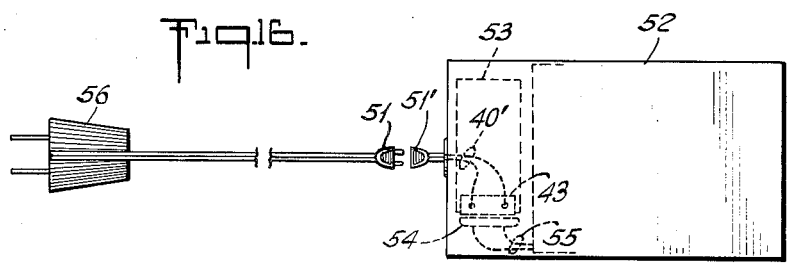
FIG. 16 illustrates the utilization of the apparatus in accordance with the invention with a piece of miniature electronic equipment.

The next step in the assembly of the apparatus in accordance with the invention is shown in FIGS. 5 and 6. A germanium rectifier 25 having a length not exceeding the distance between the end walls 12 and 13 of the spool is placed at one corner of the spool as illustrated in FIG. 16 and covered with pieces of insulating material 26 to hold it in place. The starting end 27 of the secondary winding is soldered to one leg 25' of the rectifier 25 and then the first section 28a of the secondary 28 is then wound on the spool. The terminal end of the secondary 28a is denoted by the numeral 29. A piece of insulating material 30 is then placed over the winding 28a as illustrated in FIG. 7 and the leg 23" of the condenser 23 is connected to the lead 29. In addition, one terminal 31' of the condenser 31 is also connected to the lead portion 29. The secondary portion 28a with the leads 23" and 31' attached may then be covered with a layer of insulating material and winding of the second portion 28b of the secondary is continued to produce the resultant structure as shown in FIG. 8.

Since the invention now being described is in the form of a full wave rectifier, the secondary portions 28a and 28b should be approximately balanced so that they will each deliver substantially the same amount of voltage under the load. This design is well known in the art and further discussion of its importance is deemed unnecessary.

Upon completion of the secondary 28b, a piece of insulating material 32 as shown in FIG. 9 is placed over the winding and the terminal end 33 of the winding 28b is connected to the lead 34' of a second germanium rectifier 34, the latter being placed between the ends of the core 10 as shown in FIG. 9.

When this step has been completed the windings and rectifiers as installed therein are wrapped with a piece of insulating material 35 as shown in FIG. 10.

The completed coil and rectifier structure is now ready for installation of the laminations 36 in the conventional manner, as illustrated in FIG. 11. The laminations in accordance with customary practice are made of a suitable magnetic core material which in the illustration is of high permeability steel. It is apparent, however, that other core constructions and core materials may be employed without departing from the scope of the invention.

After the core 36 has been installed on the spool 10 the condenser 23 which is carried by its leads 23' and 23" is moved over and on top of the spool winding as shown in FIG. 12. The condenser 31 is then placed in position along the side of the core 36 opposite the prongs 20 and 22 as illustrated in FIG. 13 and the leads 25" and 34" of the rectifiers 25 and 34, respectively are connected together and to the lead 31" of the condenser 31. The output voltage from the rectifier as shown in FIG. 13 is obtained by leads 37 and 38 connected to terminals of the condenser 31. Upon completion of the structure as shown in FIG. 13, the entire assembly is placed in an outer housing 39 as illustrated in full size in FIG. 15 and a suitable compound such as pitch or other suitable plastic material is poured into the housing 39 and about the transformer structure to secure all of the elements therein. The prongs 16 and 22 extend from one side of the housing 19 and the entire structure gives the appearance of a conventional plug for insertion into an A.C. current outlet. The leads 37 and 38 illustrated in FIG. 13 actually form part of the cable 40 shown in FIG. 15 and leading from the housing 39.

A modified form of the rectifying apparatus in accordance with the invention is illustrated in FIG. 14. This embodiment of the invention is substantially identical to the embodiment shown and described in connection with FIGS. 1 to 13 except that the germanium rectifiers 25 and 34 are disposed on the outside of the spool 10 as illustrated. In this form of the invention, however, the leads 25' and 34' of the rectifiers 25 and 34 are connected to the transformer windings during the course of the winding procedure, as described in connection with FIGS. 1 to 13 so that when the transformer winding is completed the only circuit connections required are the attachment of the leads 25" and 34" to the condenser lead 31", as in the case of the previous embodiment of the invention.

The rectifier in accordance with this invention is intended to be used to supply energy, either directly to a load or to the load in parallel with an appropriate battery. It is evident however, that the rectifier can be used to deliver any desired voltage or current, though it is particularly intended for utilization with conventional 9-volt batteries such as the battery 42 shown in full size in FIG. 15. Batteries of this character are commonly used to power miniaturized radio receivers. In most cases it is desirable that the load be connected to the battery during operation with or without the rectifier, as previously described. In order to enable the battery to be connected with the lead and at the same time connected to the charging apparatus in accordance with the invention, an improved connector 43 may be utilized. This connector has a strip of insulating material 44 adapted to lie against the side of the battery and carries a pair of spring clips 45 and 46 for embracing the terminals 47 and 48 of the battery. Each of the clips 45 and 46 is made of a relatively thin material and of a length somewhat greater than 180 degrees. The clip 45 is adapted to engage the cylindrical shank 47' of the terminal 47 which lies below the spring fingers 47". The spring clip 46 engages the cylindrical terminal 48 and lies against the flange 48' adjoining the surface of the battery 42. When the clip 43 is in place, the connector 49 is then attached to the battery for supplying the load denoted by the numeral 50. In certain cases it may be desirable to maintain the clip 43 in engagement with the battery terminals at all times. Under these conditions it is desirable to provide means for disconnecting the rectifying apparatus such as the cooperating disconnecting means 51 and 51'. The disconnect means should of course be polarized in order to avoid difficulty in connecting and disconnecting the rectifying apparatus.

FIG. 16 shows the utilization of a rectifier in accordance with the invention with a miniature radio receiver denoted generally by the numeral 52. The conventional radio receiver battery is denoted in dotted outline by the numeral 53 and is normally connected to the receiver by the plug 54 and leads 55. To install the rectifying apparatus in accordance with the invention the battery compartment is opened and the clip 43 is placed in engagement with the battery terminals as described in connection with FIG. 15 and the leads 40' from the clip 43 to the plug member 51' are brought out through the wall of the casing battery compartment. The cover is then placed in position on the housing. Thereafter, when the receiver 52 is used in a position where conventional A.C. current is available, the rectifier in accordance with the invention and denoted by the numeral 56 in this figure is attached to the receiver by coupling the plug portion 51 with the plug portion 51' and then the rectifier is merely plugged into the house current.

The circuit of the rectifier in accordance with the invention is shown in FIG. 17 and the components previously described are identified in this figure by like numerals. It will be observed that this embodiment of the invention is of the full wave rectifier type, though it is evident that adequate results could be obtained utilizing other types of rectifier arrangements such as half wave rectifiers, bridge rectifiers, or the like. Inasmuch as the rectifier is intended for use with conventional dry batteries of the 9-volt type, it is desirable to arrange the secondary 28 of the transformer so that the current delivered to the battery will be inversely proportional to the voltage of the battery. For instance, if the 9-volt battery has dropped to approximately 6 or 7 volts, the rectifier can be connected to recharge the battery while the receiver is not being utilized. With proper voltage control on the rectifier, the current delivered to the battery will decrease as its voltage comes up to normal, and when the voltage attains normal, the rectifier will not deliver any current to the battery, so that the possibility of damaging the battery is minimized if the rectifier operates to charge the battery for indefinite periods. When the radio or other load is operated while the rectifier is delivering current to the battery, the rectifier will operate to assume the major portion of the load current and the battery will merely float on the line and little, if any, power will be consumed from the battery.

The invention as described above affords a new and improved mode of fabricating electronic circuitry where compactness, ruggedness and dependability are important factors. Furthermore, through the novel and improved arrangement of elements the entire unit constitutes, in essence, an integral structure which greatly simplifies fabrication and results in a materially decreased cost of the completed item.

While only certain embodiments of the invention have been illustrated and described, it is understood that alterations, changes and modifications may be made without departing from the true scope and spirit thereof as defined by the appended claims.

What is claimed is:

1. Rectifying apparatus comprising a transformer having at least two windings and a core of magnetic material in magnetic circuit with said windings, a pair of spaced rigid parallel supporting prongs extending from said transformer with one of said prongs having part thereof underlying one of said windings and the other of said prongs overlying said one winding, rigid insulating means positively locking said prongs against longitudinal shifting thereof with respect to said windings, connections between said prongs and said one winding, and rectifier means connected with another of said windings and physically disposed between said windings with one terminal of the rectifier means connected to the one end of the other winding and the other terminal of said rectifier means extending from said windings.

2. Apparatus for rectifying alternating current comprising a transformer having overlying primary and secondary windings wound on a tubular insulating member, a first supporting and electrode prong of relatively high electrical and heat conducting capacity underlying said primary winding and extending outwardly therefrom in a direction substantially parallel to the axis of said tubular insulating member, a second supporting and electrode prong of relatively high electrical and heat conducting capacity overlying said primary winding and extending therefrom in spaced parallel relationship to the first prong, means to positively lock said supporting electrodes in said relationship and against movement with respect to said windings, connections between said primary winding and said prongs for applying alternating current energy to said primary winding, and a rectifier having at least part thereof physically disposed between the primary and secondary windings with one terminal of the rectifier connected to the inner end of said secondary winding and the other terminal extending from said winding.

3. Apparatus for rectifying alternating current comprising a transformer having overlying primary and secondary windings wound on a tubular insulating member, a first rigid supporting and electrode prong of relatively high electrical and heat conducting capacity underlying said primary winding and extending outwardly therefrom in a direction substantially parallel to the axis of said tubular insulating member, a second rigid supporting and electrode prong of relatively high electrical and heat conducting capacity overlying said primary winding and extending therefrom in spaced parallel relationship to the first prong, means to positively lock said supporting electrodes in said relationship and against movement with respect to said windings, connections between said primary winding and said prongs for applying alternating current energy to said primary winding, a rectifier physically disposed between said primary and secondary windings with one terminal of the rectifier connected to the inner end of said secondary winding and the other terminal extending from said winding, a second rectifier overlying said windings with one terminal connected to the terminal end of said secondary windings and the other terminal extending from the windings, a lead connected to the center point of said secondary windings and extending therefrom, a connection between said other rectifier terminals and a condenser connected between said other terminals and said center point connection.

4. Apparatus for rectifying alternating current comprising a transformer having overlying primary and secondary windings wound on a tubular insulating member, a first rigid supporting and electrode prong of relatively high electrical and heat conducting capacity underlying said primary winding and extending outwardly therefrom in a direction substantially parallel to the axis of said tubular insulating member, a second rigid supporting and electrode prong of relatively high electrical and heat conducting capacity overlying said primary winding and extending therefrom in spaced parallel relationship to the first prong, insulating means unitary with said tubular insulating member to positively lock said supporting electrodes in said relationship and against movement with respect to said windings, connections between said primary winding and said prongs for applying alternating current energy to said primary winding, a rectifier disposed between said primary and secondary windings with one terminal of the rectifier connected to the inner end of said secondary winding and the other terminal extending from said winding, a second rectifier overlying said secondary winding with one terminal connected to the terminal end of said secondary winding and the other terminal extending from the winding, a lead connected to the center point of said secondary winding and extending therefrom, a connection between said other rectifier terminals, a condenser connected between said other terminals and said center point connection, and housing means enclosing said apparatus with said prongs projecting from said housing for attachment to a source of alternating current and furnishing support for said apparatus.

5. The method of assembly of apparatus including a transformer having a spool for carrying windings, a magnetic core and supporting terminals for said transformer comprising the steps of placing a first supporting terminal on said spool with the terminal extending therefrom and positively locked therein, connecting the end of a supply of wire to that part of said terminal overlying said spool, winding successive layers of wire on said spool and over said terminal part until a predetermined number of turns of wire are applied, terminating said wire, applying a second terminal to said spool with at least part in overlying relationship to said winding and in positive longitudinal interlocking relationship with said spool, said second terminal extending from the winding, connecting the last end of the wire to the last said terminal, placing a rectifier on said winding, connecting the end of a supply of wire to one terminal of the rectifier with the other terminal of the rectifier extending from the spool, winding successive turns of wire on said spool and over said rectifier to complete a second winding and then installing the transformer core.

6. The method of assembly of apparatus including a transformer having a spool for carrying windings, a magnetic core and supporting terminals for said apparatus comprising the steps of placing a first supporting terminal on said spool with the terminal extending therefrom and positively locked thereto, connecting the end of a supply of wire to that part of said terminal overlying said spool, winding successive layers of wire on said spool and over said terminal part until a predetermined number of turns of wire are applied, terminating said wire, mechanically interlocking a second terminal with said spool with at least part in overlying relationship to said winding, said second terminal extending from the winding, connecting the last said end of the wire to the last said terminal, placing a rectifier on said winding, connecting the end of a supply of wire to one terminal of the rectifier with the other terminal of the rectifier extending from the spool, winding successive turns of wire on said spool and over said rectifier to complete a second winding, connecting a tapping lead to said wire forming the second winding and then continuing the application of turns to complete a third winding, terminating the third winding, connecting a second rectifier to the last said termination of the third winding with the other terminals of said rectifier extending from the spool and then installing the transformer core.

7. The method according to claim 6 including the steps of connecting the other terminals of said rectifiers one to the other, then connecting a condenser between said tapping lead and the connection of said rectifiers one to the other, and mounting said assembled apparatus in a housing with said prongs extending from said housing for support of said apparatus in a current supply socket for application of alternating current energy to said apparatus while freely conducting heat from said apparatus to said socket.

8. Electrical apparatus comprising a housing, a pair of substantially rigid electrode prongs extending from said housing for engagement with a female connector having an A.C. voltage connected thereto, an alternating current voltage reducing transformer in said housing having a coil structure thereon including a spool with at least two coils and a magnetic core with a portion thereof extending through said spool, rectifying and filtering means in said housing and connected to one of said transformer coils to produce low voltage direct current, said prongs extending into and mechanically interlocked with said spool and against longitudinal displacement relative thereto whereby said prongs function through said coil structure to provide mechanical support for said apparatus, and electrical connections between the other of said coils and said prongs.

9. In electrical apparatus for converting high voltage alternating current to low voltage direct current, a transformer and prong structure for attachment to a stationary electrical female receptacle for supporting and energizing said apparatus, said structure comprising a spool having coils wound thereon, a magnetic core with at least part thereof extending through the spool, said prongs extending into said spool and mechanically interlocked therewith against longitudinal displacement and connections between one of said coils and said prongs, said prongs adapted to be engaged by said receptacle to support and energize said coil and said coil and spool providing support for said apparatus.

References Cited by the Examiner

UNITED STATES PATENTS

| 1,400,038 | 12/1921 | Egerton | 336—192 |
|---|---|---|---|
| 1,470,337 | 10/1923 | Thordarson | 336—192 |
| 2,050,437 | 8/1936 | Kirkwood | 325—492 |
| 2,222,196 | 12/1940 | Vilkomerson | 325—492 |
| 2,628,339 | 2/1953 | Werner | 320—2 |
| 2,875,420 | 2/1959 | Hofer et al. | 336—192 |
| 2,881,382 | 4/1959 | Amato | 321—8 |
| 2,929,132 | 3/1960 | Wohlhieter | 336—192 X |
| 3,019,381 | 1/1962 | Howard | 321—8 |
| 3,089,071 | 5/1963 | Hartwig | 310—47 |

FOREIGN PATENTS

| 1,025,133 | 1/1953 | France. |
|---|---|---|
| 1,072,701 | 1/1960 | Germany. |

LLOYD McCOLLUM, *Primary Examiner.*

SAMUEL BERNSTEIN, *Examiner.*